United States Patent
Moore et al.

(10) Patent No.: US 6,464,944 B1
(45) Date of Patent: *Oct. 15, 2002

(54) APPARATUS AND METHOD FOR CONTROLLED DECOMPOSITION OXIDATION OF GASEOUS POLLUTANTS

(75) Inventors: Robert R. Moore, Napa, CA (US); James D. Getty, Vacaville, CA (US); Ravil Safiullin, South San Francisco, CA (US)

(73) Assignee: Advanced Technology Materials, Inc., Danbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/228,706

(22) Filed: Jan. 12, 1999

(Under 37 CFR 1.47)

Related U.S. Application Data

(63) Continuation-in-part of application No. 09/005,856, filed on Jan. 12, 1998, now Pat. No. 6,153,150.

(51) Int. Cl.[7] .............................. F01N 3/10; B01D 53/34; B01D 53/74
(52) U.S. Cl. ..................... 422/173; 422/169; 422/170; 422/171; 422/172; 422/178; 422/110; 422/111; 96/290; 96/372
(58) Field of Search ................................ 422/168–174, 422/178, 110, 111; 96/290, 372

(56) References Cited

U.S. PATENT DOCUMENTS

| | | | |
|---|---|---|---|
| 3,691,729 A | 9/1972 | De Rooy et al. | 95/211 |
| 3,780,675 A | 12/1973 | Frye et al. | 110/215 |
| 3,902,853 A | 9/1975 | Marsee et al. | 422/171 |
| 4,420,462 A | 12/1983 | Clyde | 422/201 |
| 4,509,456 A | 4/1985 | Kleinert et al. | 118/715 |
| 4,719,088 A | 1/1988 | Itoh et al. | 422/106 |
| 4,981,722 A | 1/1991 | Moller et al. | 427/248.1 |
| 5,011,520 A | 4/1991 | Carr et al. | 96/234 |
| 5,037,624 A | 8/1991 | Tom et al. | 423/210 |
| 5,151,395 A | 9/1992 | Tom | 502/67 |
| 5,156,827 A | 10/1992 | Tom et al. | 423/299 |
| 5,277,026 A | 1/1994 | Boll et al. | 60/288 |
| 5,407,646 A | 4/1995 | Smith et al. | 422/168 |
| 5,427,746 A | 6/1995 | Pereira et al. | 422/177 |
| 5,518,528 A | 5/1996 | Tom et al. | 95/103 |
| 5,614,156 A | 3/1997 | Wang | 422/174 |
| 5,622,682 A | 4/1997 | Tom | 423/230 |
| 5,643,538 A | 7/1997 | Morlec et al. | 422/173 |
| 5,676,712 A | 10/1997 | Anderson | 48/192 |
| 6,153,150 A | * 11/2000 | Moore et al. | 422/173 |

FOREIGN PATENT DOCUMENTS

| | | |
|---|---|---|
| EP | 0 057 878 A1 | 8/1982 |
| EP | 0 346 893 A1 | 12/1989 |
| EP | 0 347 753 A1 | 12/1989 |
| EP | 768109 * | 4/1997 |
| WO | WO 90/14184 | 11/1990 |
| WO | WO 94/21968 | 9/1994 |
| WO | WO 95/18674 | 7/1995 |
| WO | WO 96/00076 | 1/1996 |
| WO | WO 96/23173 | 8/1996 |
| WO | WO 97/30275 | 8/1997 |

* cited by examiner

*Primary Examiner*—Hien Tran
(74) *Attorney, Agent, or Firm*—Marianne Fuierer; Robert A. McLauchlan, III

(57) ABSTRACT

An apparatus is provided for treating pollutants in a gaseous stream. The apparatus comprises tubular inlets for mixing a gas stream with other oxidative and inert gases for mixture and flame production within a reaction chamber. The reaction chamber is heated by heating elements and has an interior wall with orifices through which heated air enters into the central reaction chamber. The oxidized gases are treated also for particles removal by flowing through a packed bed. The packed bed is cooled and its upper portion with air inlets to enhance condensation and particle growth in the bed. The treated gas stream is also scrubbed in a continuous regenerative scrubber comprising at least two vertically separated beds in which one bed can be regenerated while the other is operative so that the flow may be continuously passed through the bed.

20 Claims, 8 Drawing Sheets

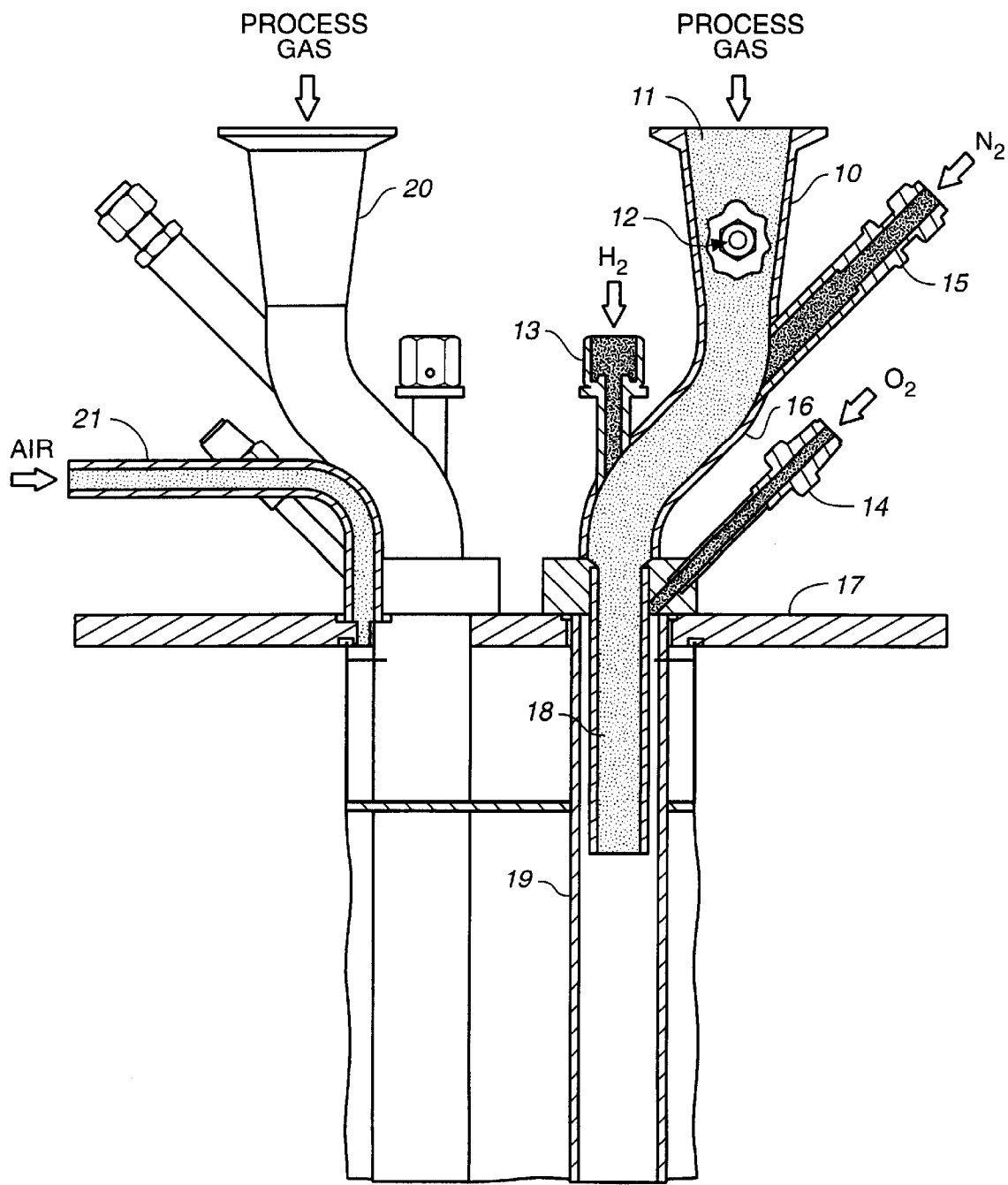
FIG._1A

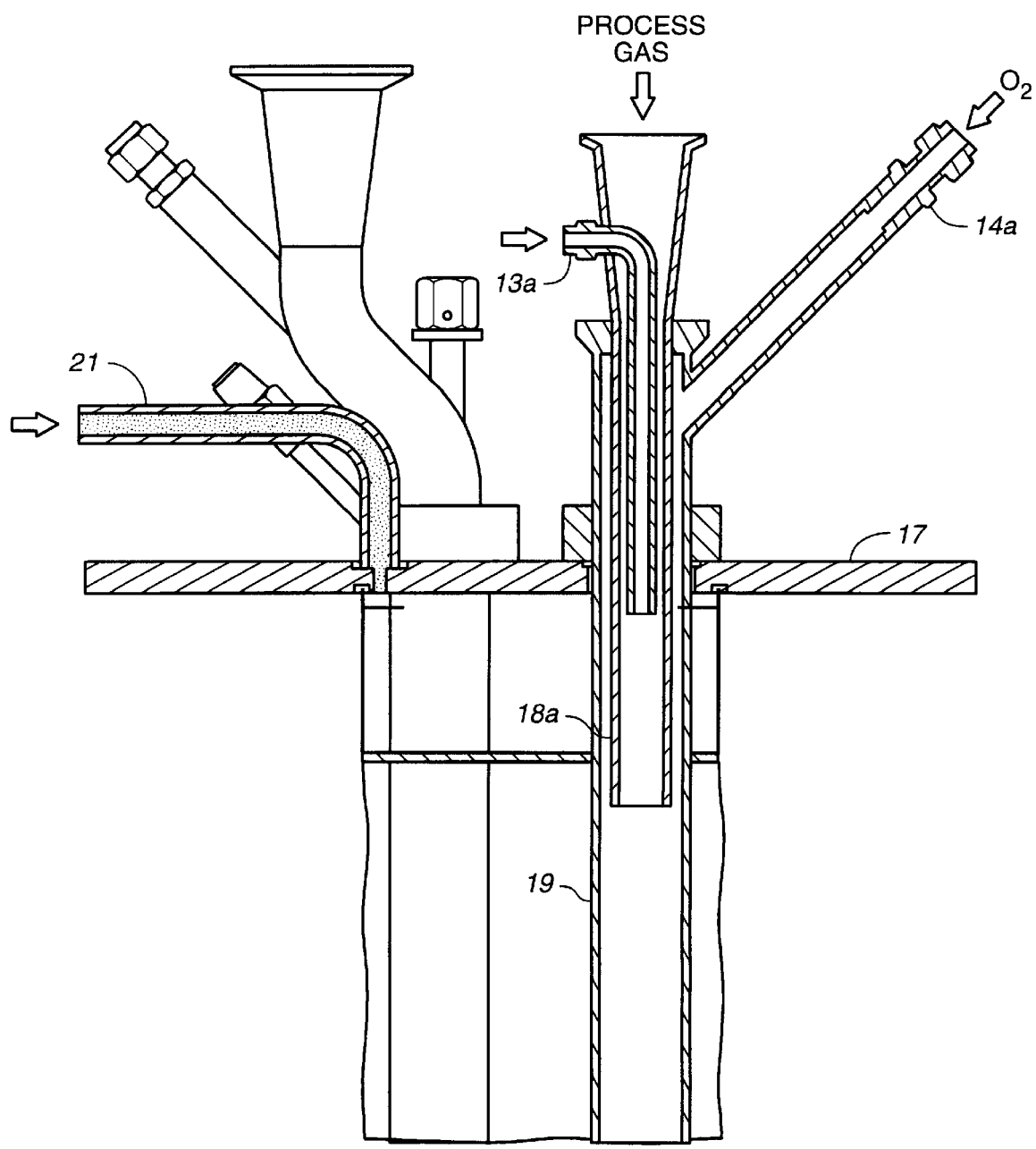
FIG._1B

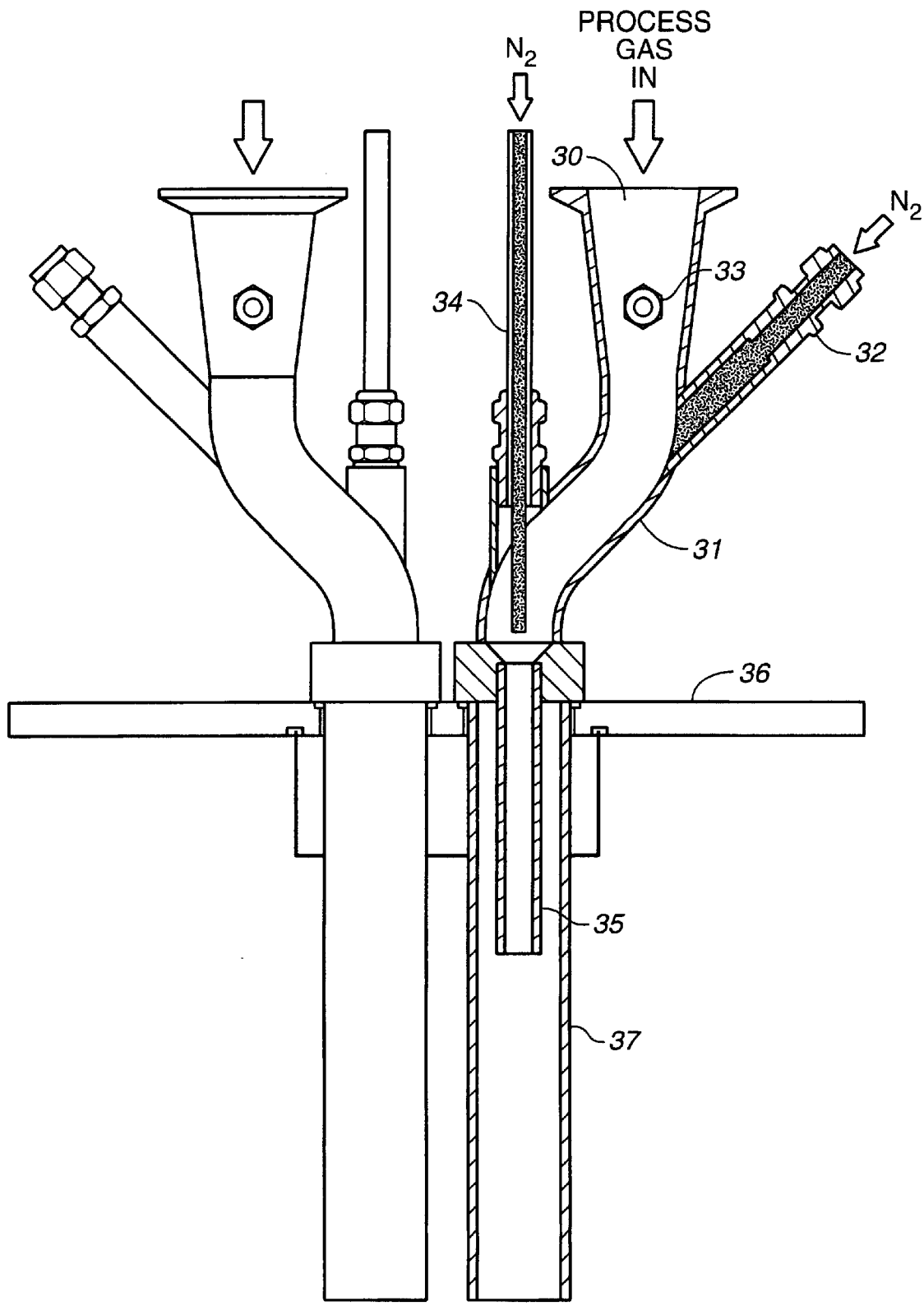
FIG._2

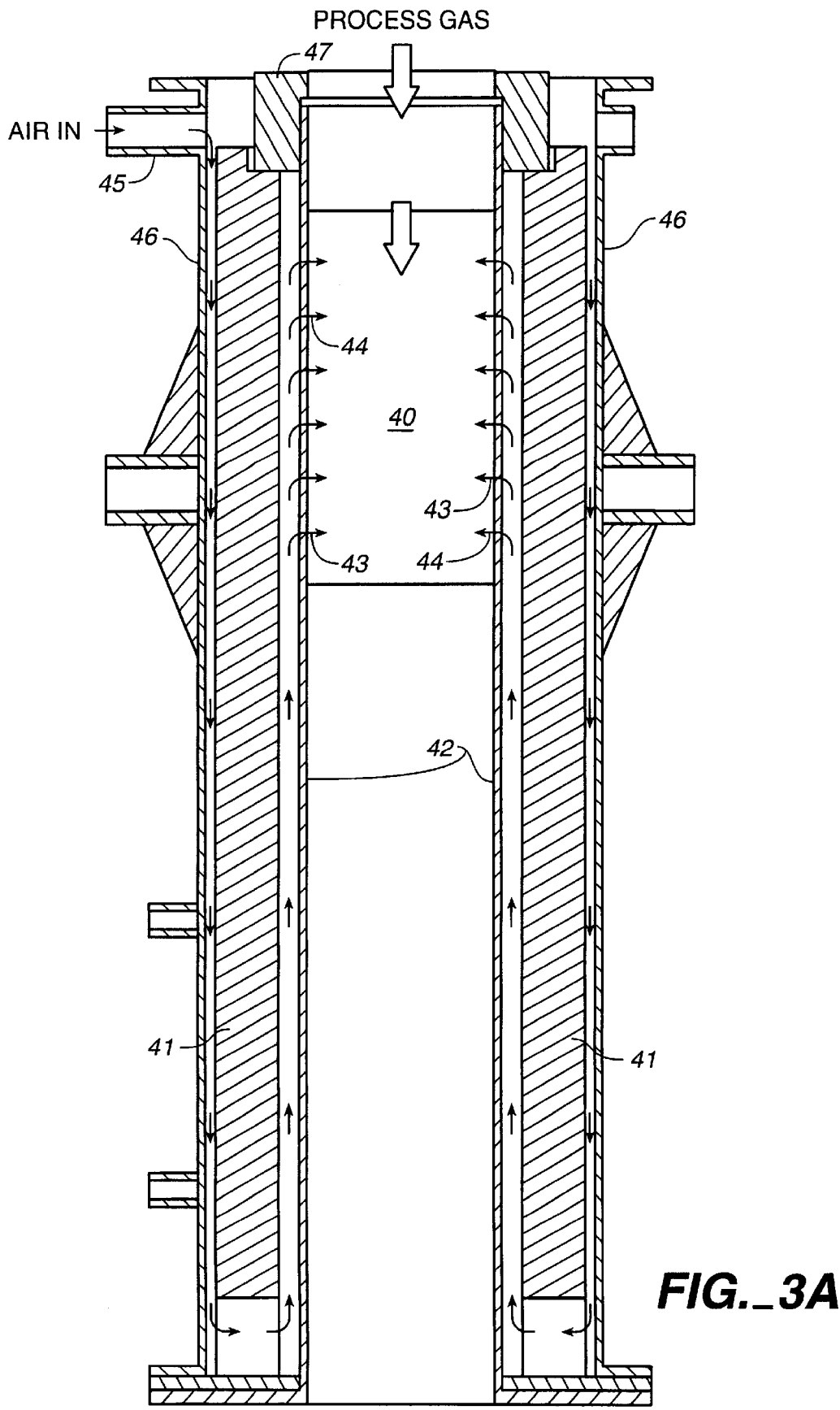
FIG._3A

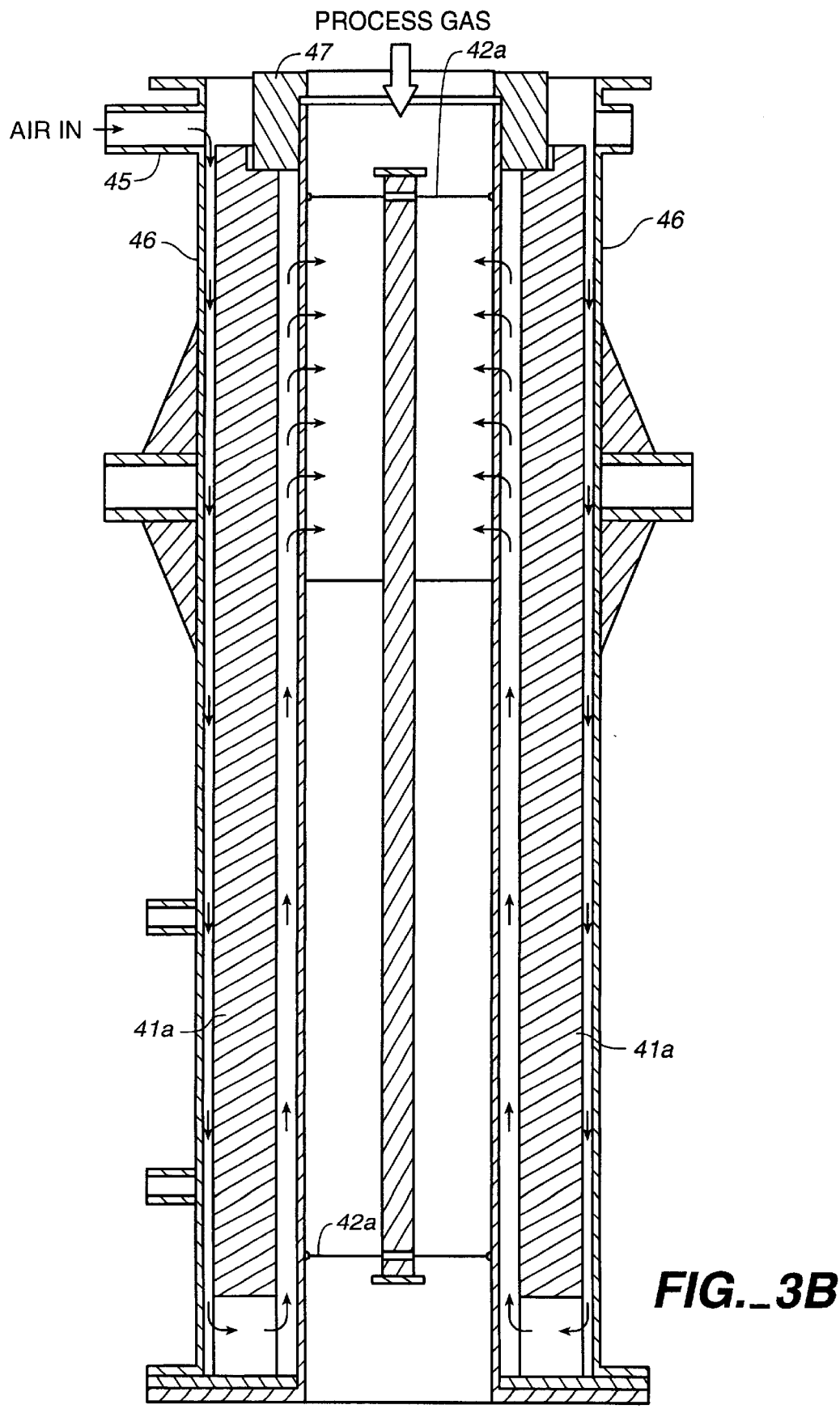
FIG._3B

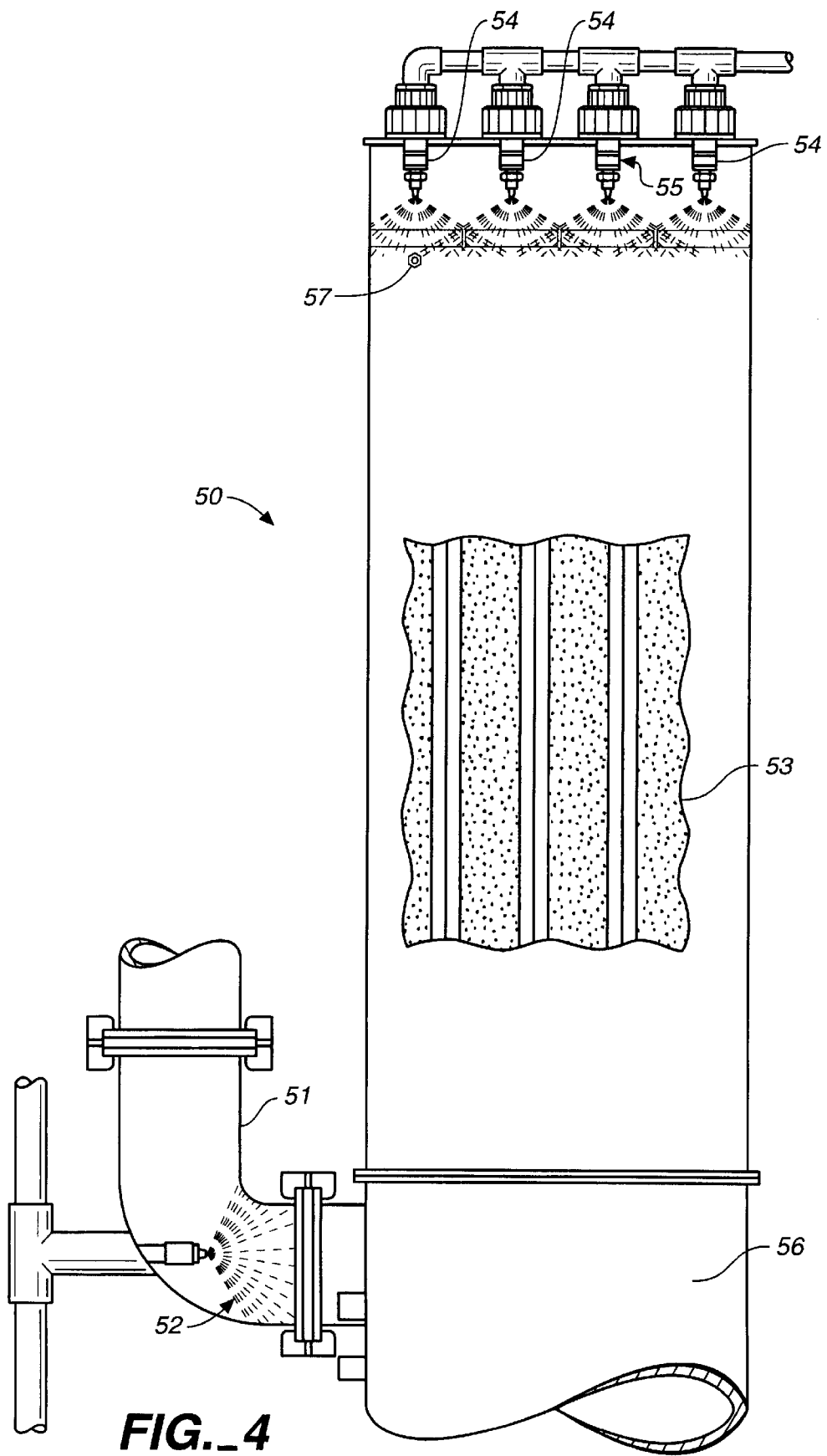
FIG._4

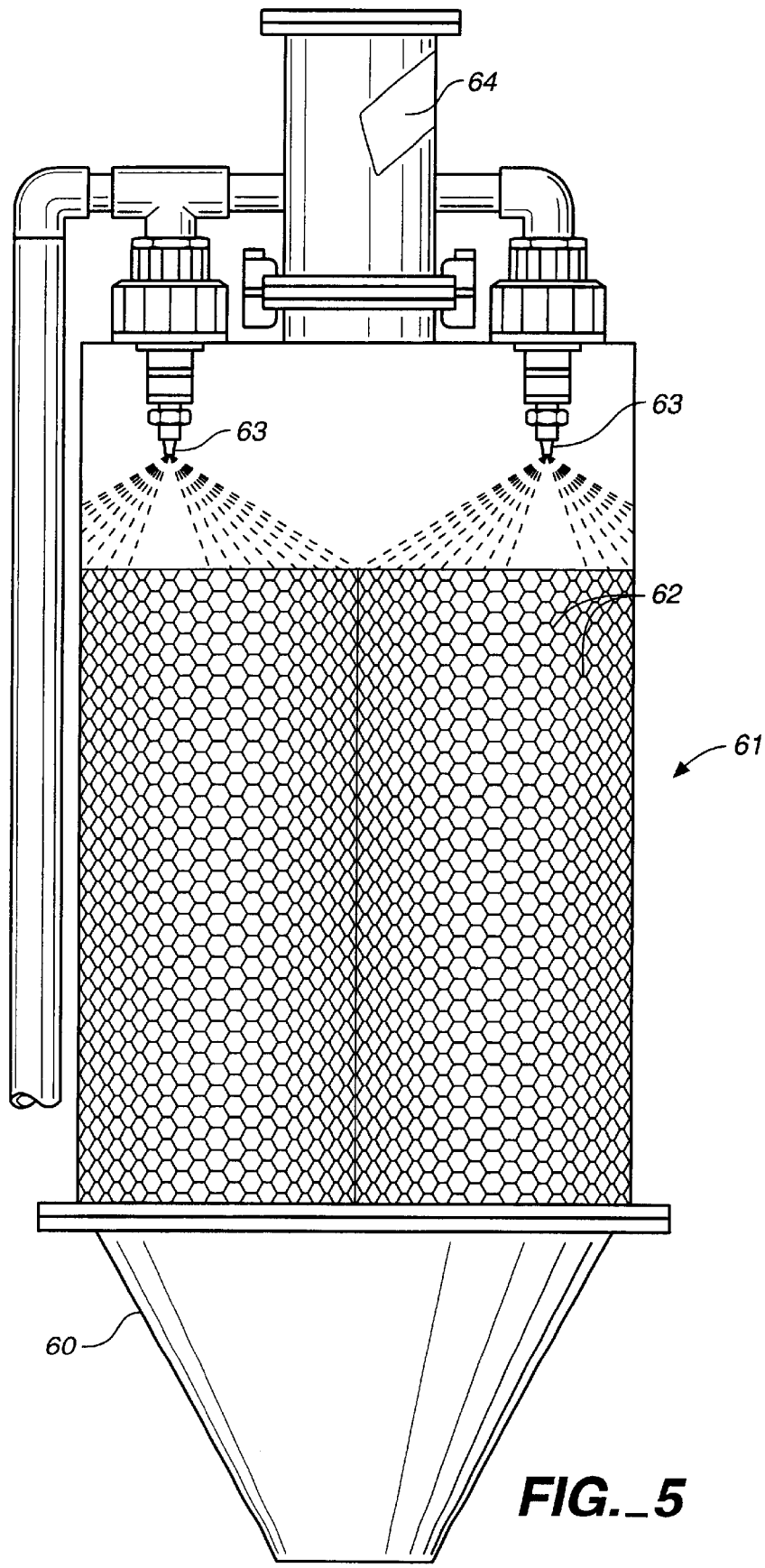
FIG._5

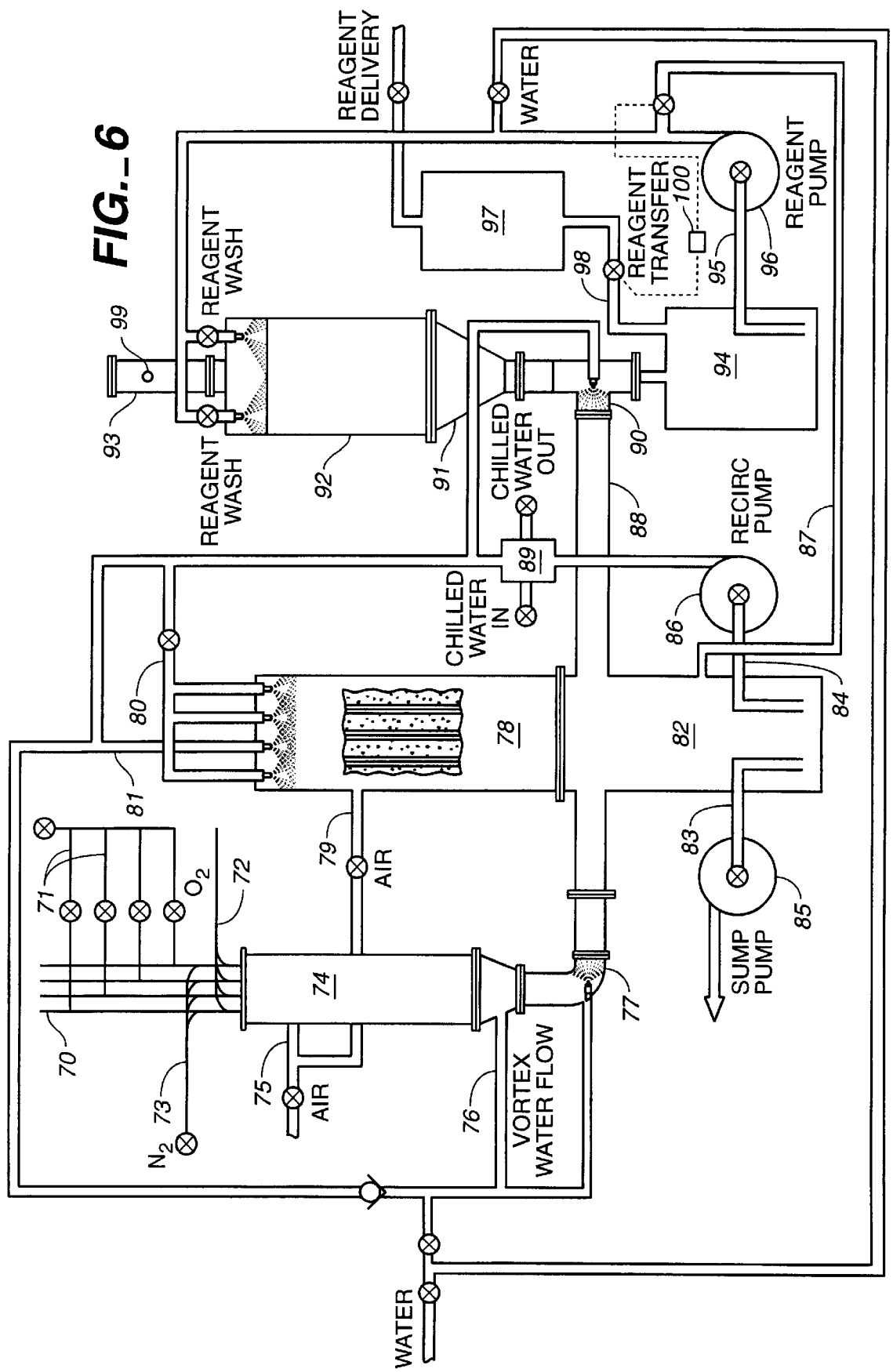
FIG._6

APPARATUS AND METHOD FOR CONTROLLED DECOMPOSITION OXIDATION OF GASEOUS POLLUTANTS

CROSS REFERENCE TO RELATED APPLICATIONS

This is a continuation-in-part of U.S. Ser. No. 09/005,856, filed Jan. 12, 1998, now U.S. Pat. No. 6,153,150.

The present invention relates to an apparatus and method for the treatment of gas streams containing organic and inorganic pollutants, suitable for applications such as treatment of streams resulting from fabrication of semiconductor materials and devices, microelectric products, manufacturing of compact discs and other memory devices.

BACKGROUND OF THE INVENTION

The gaseous effluents from the manufacturing of semiconductor materials, devices, products and memory articles involves a wide variety of chemical compounds used and produced in the process facility. These compounds include inorganic and organic compounds, breakdown products of photo-resist and other reagents, and a wide variety of other gases which must be removed from the waste gas streams before being vented from the process facility into the atmosphere. In such systems, process gas, which may be a single component or multi-component composition, is mixed with an oxidant, such as high purity oxygen, air or nitrous oxide, then the resulting gas mixture is oxidized in a reaction chamber.

In semiconductor manufacturing processes, various processing operations can produce combustible gas streams. Hydrogen and a variety of hydride gases such as silane, germane, phosphine, arsine, etc. may be present and, if combined with air, oxygen or other oxidant species such as nitrous oxide, chlorine, fluorine and the like, form combustible mixtures.

However, the composition of the waste gas generated at a work station may vary widely over time as the successive process steps are carried out.

Faced with this variation of the composition of waste gas streams and the need to adequately treat the waste gas on a continuous basis during the operation of the facility, a common approach is to provide a single large scale waste treatment system for an entire process facility, which is over designed in terms of its treatment capacity, which can continuously treat the waste gas. Large scale oxidation units, which often use catalytic chemistry, however, are typically expensive, particularly since they are over designed in terms of treatment capacity, must be heated to an appropriate elevated temperature and often generate a substantial amount of heat. It is difficult to make such gas treatment processes economically viable without recovering a substantial portion of the heat generated.

Accordingly, oxidation beds in large scale, typically single unit catalytic oxidation systems, are greatly oversized relative for the size and scale of oxidation beds which would be otherwise minimally required for treatment of the effluent stream under an average operating conditions, average concentration levels, and average composition of pollutants.

The present invention provides discrete units which may be employed at the point of use, that is, applied to a single tool, individual processing operation, and the like, within a plant facility to effectively and efficiently remove the pollutants without being over designed with respect to volume capacity, heat generation and power consumption.

SUMMARY OF THE INVENTION

The present invention provides an apparatus for removing pollutants from gaseous streams which comprises a thermal reactor, a particle removal chamber and a regenerable acid scrubber. The thermal reactor is provided with at least one inlet comprising a conduit terminating with a portion of the conduit within the reactor which projects into the reactor into a tube defining an area in which there is flame formation. The thermal reactor comprises a central chamber accommodating heating elements, a side inlet communicating with an exterior air space between the exterior wall and the heating elements, and an interior air space communicating with the exterior air space. The interior air space is defined by the interior wall and the heating elements, and an orifice in the interior wall is provided for introducing air from the interior space into the central chamber. The gases exiting the thermal reactor are passed through a liquid vortex which cools gases from the reaction chamber.

The gases from the combustion chamber are then passed through a counter-current/co-current flow packed bed for trapping and condensing particles by upwardly flowing the gas stream through the packed bed against a down flowing liquid. Air inlets are provided for flowing air to the upper portion of the bed to cool the upper portion of the bed for further condensation and particle growth within the bed.

A scrubber is also provided for removing chemical pollutants. The scrubber comprises at least two vertically separated beds containing coated packing and a monitoring means for automatically controlling selective introduction of a regenerative coating into the beds.

BRIEF DESCRIPTION OF THE DRAWING

FIG. 1a is a partial cut-away view of an intake nozzle according to the invention for introducing the effluent gases from the processing facility into the thermal reactor.

FIG. 1b shows a modification of the nozzle of FIG. 1a having concentric tubes for introducing gases into the thermal reactor.

FIG. 2 is a partial cross-section of another embodiment of an inlet nozzle.

FIG. 3a is a cut-away view of the elevation of a thermal reactor according to the present invention.

FIG. 3b shows a modification of the reactor of FIG. 3a having a centrally located heating element.

FIG. 4 is a partial cut-away view of an elevation of a particle removal chamber according to the present invention.

FIG. 5 is a partial cut-away view of an elevation of the regenerable acid scrubber according to the invention.

FIG. 6 is a diagram of an apparatus comprising the thermal reactor, particle removal chamber and regenerable acid scrubber.

DETAILED DESCRIPTION OF THE PREFERRED EMBODIMENTS

With reference to FIG. 1a, there is shown an inlet 10 into which is introduced the process gas 11. An inlet pressure monitoring port 12 is shown. In this embodiment, there is an independent gas inlet or tube 13 for the introduction of hydrogen, independent inlet 14 for oxygen, and downstream of nitrogen inlet 15. However, the inlet need not have such a curvature and thus may have a straight configuration. The inlet tube continues pass the reactor wall 17, terminating with an extension 18 of the inlet tube. The mixed gases exit the extension 18, however not directly into the reactor volume, but instead into a concentric tube 19. The temperature of the mixture of gases and gas flow are selected such that the flame is produce entirely within the tube 19. This provides for use of multiple inlets, each with slightly different gas mixtures, combustion temperatures and flame size as shown in FIG. 1a. A second inlet 21 adjacent to inlets 10 and 20 is shown for introducing air or nitrogen between the inlet tubes at the reactor chamber. Preferably, nitrogen or other inert gas is introduced through inlet 21 to minimize particle build-up on the walls of the reaction chamber 40 shown in FIG. 3a. In such a case, if additional air is needed in the reactor, a air inlet (not shown) located away from the reaction wall may be provided. The separate inlets 10 and 20 permit controlled oxidation, reduce the probability of incompatible gas stream mixing and permit active inlet pressure control independent of these parameters being utilized at adjacent inlets. The inside surfaces of extension 18 and/or tube 19 may be coated with an appropriate catalyst to effect desirable reactions of the input gases prior to passage into the thermal reactor.

Referring to FIG. 1b, tubes 13a, 18a, and 14a are concentric for delivery of inert gas (or hydrogen, if required), process gas, and oxygen, respectively, into the reactor. The delivery of the process gas is also through a straight tube 18a.

Referring to FIG. 2, there is shown a second embodiment of an inlet 30, also having a bend 31 downstream from the nitrogen inlet 32 which facilitates mixture of the process gases. However, inlet 30 need not have such a curvature and thus may have a straight configuration. An inlet pressure control port 33 is provided. A vertical nitrogen stream inlet 34 is provided downstream of the bend 31 to force gases into the extension 35 which passes through the reactor wall 36. The extension 35 is surrounded by a concentric tube 37 to isolate the process gas from adjacent inlets. The inside surfaces of extension 35 and/or tube 37 may be coated with an appropriate catalyst to effect desirable reactions of the input gases prior to passage into the thermal reactor.

Referring to FIG. 3a, there is shown a thermal reactor according to the present invention. Process gas enters through inlets (not shown) at the top of the reactor into the central chamber 40. Heating elements 41 are electrically heated to provide high temperature hot surfaces on the interior wall 42. Heating elements 41 are shown as annularly located surrounding the chamber 40. Heating elements may also be located within chamber 40. Heated air is introduced into the upper portion of the reactor chamber 40 as indicated by arrows 43 through orifices 44 in the interior wall 42.

In FIG. 3b, the heating element 41b is centrally located within the chamber 40, suspended by brackets 42a.

Air is provided through the air inlet 45 into an exterior heating space formed between the exterior wall 46 and the heating elements 41. The air downwardly flows along the surface of the heating elements then upwardly flows along the interior heating space defined by the heating elements 41 and interior wall 42. The heated air exits into the upper portion of the reactor chamber 40 through the orifices 44. The interior and exterior heated spaces along the annular heaters are isolated from each other by a seal 47.

The reacted gases exit the reactor at the bottom of chamber 40 into a conical shaped chamber with a vortex of cooling water (not shown). Typically the gases are cooled to a temperature of less than 100° C. by the water vortex.

Referring to FIG. 4, there is shown a particle removal chamber 50. The gases from the thermal reactor are introduced through conduit 51 and passed through a water spray 52 and into a packed bed containing packing 53 (shown in partial cut-away view) through which the gases are flowed in both a co-current and counter-current manner through the packing with and against the flow of water provided by intermittent sprayer 54 and continuous sprayer 55. Particle-containing liquid flows to the bottom to a sump tank 56. Air is injected through port 57 to provide direct gas cooling and promote water vapor condensation. Water vapor condensing on small particles increases their size. These particles of a size greater than about 1 micron are removed by being flowed through the packed bed at low velocities.

Referring to FIG. 5, there is shown a regenerative chemical scrubber according to the present invention. The purpose of the scrubber is to treat the effluent gases to lower certain components below the threshold limit value (TLV). The gases to be treated in the scrubber enter through the plenum 60. The gases flow upwardly through the scrubber 61 comprising two separate dry packed beds 62. The sprayers 63 introduce a reagent to the top of the packed beds 62. The reagent coats the packing material and entraps or reacts with the reactant target gases. The reagent is introduced to both beds 62 alternately. Some of the reagent is retained and coats the packing material and the excess drains into a recirculation tank (not shown) past plenum 60. This periodic recycling of the reagent re-coats the packing and maximizes the lifetime of the reagent. The scrubber is intended to remove the reactant gases from the gas stream by both flow of gas counter to the reagent flow and co-current flow of reagent and entrapped pollutants. The treated effluent gas exits through flue 64 and the liquid containing the removed chemicals drains out the bottom of the scrubber past plenum 60. It is a feature of the scrubber to have at least two separate packed beds 62 so that when the chemical coating on the packing material becomes depleted in one bed, the coating may be replenished while the other bed is still operable. In this manner, the scrubber may be continuously operated.

Referring now to FIG. 6, there is shown in diagram form a processing facility using all of the above described features. The process gas from one or more stations enters the inlets 70, and is mixed, if required, with hydrogen through inlets 71, oxygen through inlets 72 and with an inert purge gas, such as nitrogen through inlets 73. The capacity of the facility will depend upon the size of hardware components, types of process gases and reagents, etc. Typical gas flow rates through the facility are less than about 600 standard liters per minute (slm). The gases are then treated in the thermal reactor 74, to which air is introduced through lines 75. The gases exiting the bottom of thermal reactor 74 pass through a conical shaped chamber 110 with a vortex of water flowing through line 76 then through a water spray 77 into the particle removal chamber 78. Air is introduced into the particle removed chamber through line 79 and water is sprayed onto the packed bed 108 through lines 80 and 81. The liquid effluent from the packed bed 108 is collected in sump 82 and discarded through line 83 or recirculated through line 84 using respective pumps 85 and 86. Reagents may also be added to sump 82 through line 87. The recirculated fluids from sump 82 are cooled at heat exchanger 89 before being recirculated to the top of the particle removal chamber 78. The treated gases are then flowed through conduit 88 through a spray 90 of reagent from sump 82 then into plenum 91 to the regenerative chemical scrubber 92. After treatment in the scrubber the completely treated gases exit through stack 93. Reagent from the chemical scrubber 92 is collected in tank 94 and can be recirculated via line 95 and pump 96 to the chemical scrubber 92. A fresh reagent for the chemical scrubber may be held in tank 97 and added as needed through line 98 to tank 94. A detector 99 is located in the stack 93 to monitor components intended to be removed in the scrubber. When the detector registers the TLV of a component in the gas, the reagent in tank 94 may be removed by automatic control via line 95 and fresh reagent added from tank 97 via line 98. This replacement of reagent may also be automatically controlled by a timer 100 to control replacement of reagent in tank 94 after predetermined periods of use.

EXAMPLE 1

In an apparatus as shown in FIG. 3 with inlets as shown in FIG. 1, each of three typical perfluorinated compounds (PFC) present in semiconductor process gases were tested. The abatement achieved (measured as % DRE, decomposition removal efficiency) and NOx formation, based on 10% utilization of the PFC of the wafer process tool, were measured. The optimum gas flow rate (in standard liters/min, slm) and hydrogen gas addition at the reactor inlet are given to achieve the indicated DRE.

| Gas | % DRE | Pump Purge (slm) | H2 Addition (slm) | NOx Formation (kg/year) |
|---|---|---|---|---|
| $NF_3$ | >99.999 | 10–100 | 2–20 | <0.0064[1] |
| $C2F_6$ | >99.9 | 10–70 | 2–12 | <0.0064[1] |
| $CF_4$ | >90 | 10–45 | 10–45[2] | 0.22 |

[1]This is the detection limit of NOx for the mass spectrometer.
[2]Oxygen is also added at the inlet.

EXAMPLE 2

A regenerative acid scrubber as shown in FIG. 5 is tested using potassium hydroxide (50% w/w) as the scrubbing reagent. The scrubber is tested for process gases from four theoretical tools, used 20 hours/day, having the following flow rates/tool: $BCl_3$ 125 sccm; $Cl_2$ 50 sccm; $CHF_3$ 60 sccm; $CF_4$ 60 sccm. The KOH consumption is 1 kg/day and estimated storage lifetime of the KOH solution is about 50 days. The lifetime of storage for solid KOH is about 35 days. Typically, during use of the scrubber, the concentration of KOH in the scrubbing reagent will be in the range of 50% to 10%. The reagent is replaced when the KOH concentration falls below 10%.

The invention having been fully described, further modifications of the invention will become apparent to those of ordinary skill in the art. Such modifications are within the scope of the invention, which is defined by the claims set forth below.

What is claimed is:

1. An apparatus for oxidative treatment of gaseous pollutants in a process gas stream, said apparatus comprising a thermal reactor comprising heating elements and a process gas inlet for conducting said gas stream into said reactor, said process gas inlet comprising a conduit terminating with a portion of said conduit within said reactor wherein said portion of said conduit is located within a tube which projects beyond the end of said conduit to define a chamber within said tube, said tube having an open end communicating with the interior of said reactor;

said conduit further accommodating an independent inlet communicatively connected to said conduit for introducing other gases into said conduit, said independent inlet positioned along said conduit before said conduit terminates in said tube, said thermal reactor comprising a central chamber comprising said heating elements, an entry end and an exit end of said chamber, a side inlet communicating with an exterior air space defined by an exterior wall of the reactor and said heating elements, an interior air space communicating with said exterior air space, said interior air space defined by an interior wall of the reactor and said heating elements, and an orifice in said interior wall for introducing air from said interior space into said central chamber.

2. An apparatus according to claim 1, wherein said conduit is curved.

3. An apparatus according to claim 1, wherein said conduit and independent inlet are concentrically located.

4. An apparatus according to claim 1, comprising a plurality of said process gas inlets for introducing gas streams into said reactor and multiple independent inlets.

5. An apparatus according to claim 4, wherein the independent inlets are positioned along the conduits of said process gas inlets.

6. An apparatus according to claim 4, wherein said conduit accommodates three independent inlets.

7. An apparatus according to claim 1, wherein said independent inlet provides for injection of a compressed gas to provide process pressure control and to prevent flame flashback.

8. An apparatus according to claim 7, wherein said conduit and independent inlet are concentrically located.

9. An apparatus according to claim 1, wherein said heating elements are annularly located around said chamber.

10. An apparatus according to claim 1, wherein said heating elements are located within said chamber.

11. An apparatus according to claim 1, wherein said exit end of said chamber accommodates a conical shaped chamber wherein liquid is forcibly introduced into said a conical shaped chamber to form a vortex which flows into said gas stream exiting said central chamber.

12. An apparatus according to claim 1, wherein the gas stream after treatment in said thermal reactor is flowed to a particle removal chamber comprising: a packed bed, liquid inlets positioned at the top of the chamber to provide a washing liquid to an intermittent sprayer and a continuous sprayer, wherein the packed bed is for trapping and condensing particles and said gas stream is upwardly flowed through said bed against downwardly flowing liquid; and air inlets positioned below said liquid inlets to provide flowing air onto the upper portion of said bed to cool the upper portion of said bed to promote condensation and particle growth within said bed.

13. An apparatus according to claim 1, wherein the gas stream after treatment in said thermal reactor is flowed to a scrubber for removing chemical pollutants in a gas stream comprising:

an inlet for introducing said gas stream into a scrubbing chamber of the scrubber, said scrubbing chamber containing coated packing in at least two vertically separated beds, said coating being adapted to entrap or react with said pollutants;

a monitoring means for monitoring the amount of said pollutants being removed from said stream by said scrubber;

said monitoring means controlling selective introduction of a regenerative coating composition onto each of said beds to regenerate said coating on said packing.

14. An apparatus according to claim 13 wherein said monitoring means comprises a detector for measuring the concentration of a pollutant in the gas exiting said scrubber.

15. An apparatus according to claim 13 wherein said monitoring means comprises a timer to introduce said coating composition to said beds at predetermined intervals.

16. An apparatus for treatment of gaseous pollutants in a gas stream, said apparatus comprising:

a thermal reactor comprising a central chamber, heating elements, an entry end and an exit end of said chamber, a side inlet communicating with an exterior air space defined by an exterior wall of the reactor and said heating elements, an interior air space communicating with said exterior air space, said interior air space defined by an interior wall of the reactor and said heating elements, and an orifice in said interior wall for introducing air from said interior air space to said central chamber;

at least one process gas inlet for conducting said gas stream into said reactor, said process gas inlet comprising a conduit terminating with a portion of said conduit within said reactor wherein said portion of said conduit is located within a tube which projects beyond the end of said conduit to define a chamber within said tube, said tube having an open end communicating with the interior of said reactor;

said conduit further accommodating an independent inlet for introducing other gases into said conduit;

a conical shaped chamber located at the exit end of said central chamber, wherein liquid is forcibly introduced into said conical shaped chamber to form a vortex which flows into said gas stream exiting said central chamber;

a packed bed for trapping and condensing particles with downwardly flowing liquid, wherein said stream is upwardly flowed through said bed against downwardly flowing liquid;

and air inlets for flowing air into the upper portion of said bed to cool the upper portion of said bed for further condensation and particle growth in said bed;

a scrubber for removing chemical pollutants in said gas stream comprising an inlet for introducing said gas stream into a scrubbing chamber of the scrubber, said scrubbing chamber containing coated packing in at least two vertically separated beds, said coating being adapted to entrap or react with said pollutants;

monitoring means for monitoring the amount of said pollutants being removed from said stream by said scrubber, said monitoring means controlling selective introduction of a regenerative coating composition onto each of said vertically separated beds to regenerate said coating on said packing.

17. An apparatus according to claim 16, wherein said conduit is curved.

18. An apparatus according to claim 16, wherein said conduit and independent inlet are concentrically located.

19. An apparatus according to claim 16, wherein said heating elements are annularly located around said chamber.

20. An apparatus according to claim 16, wherein said heating elements are located within said chamber.

* * * * *